Patented July 17, 1928.

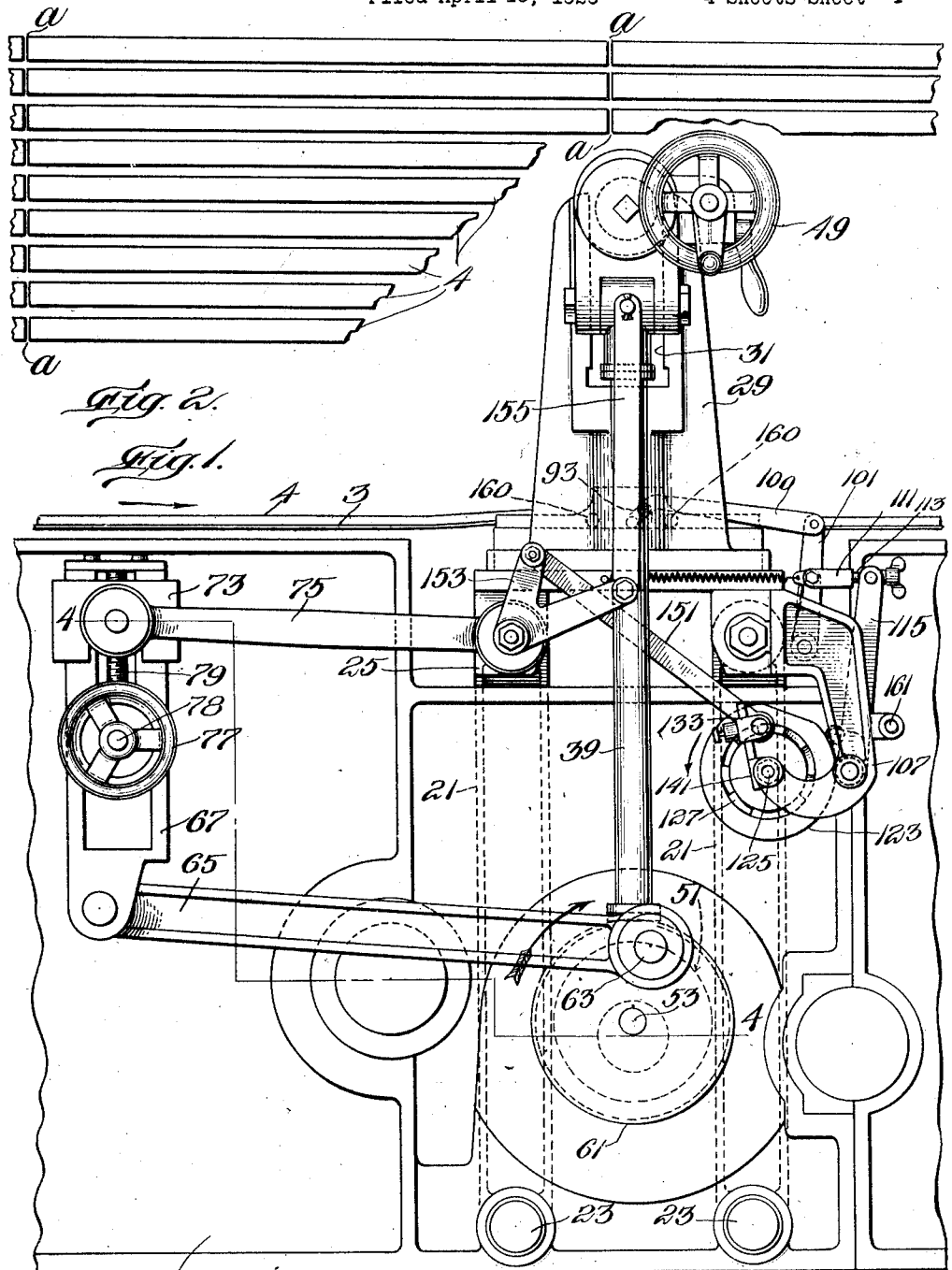

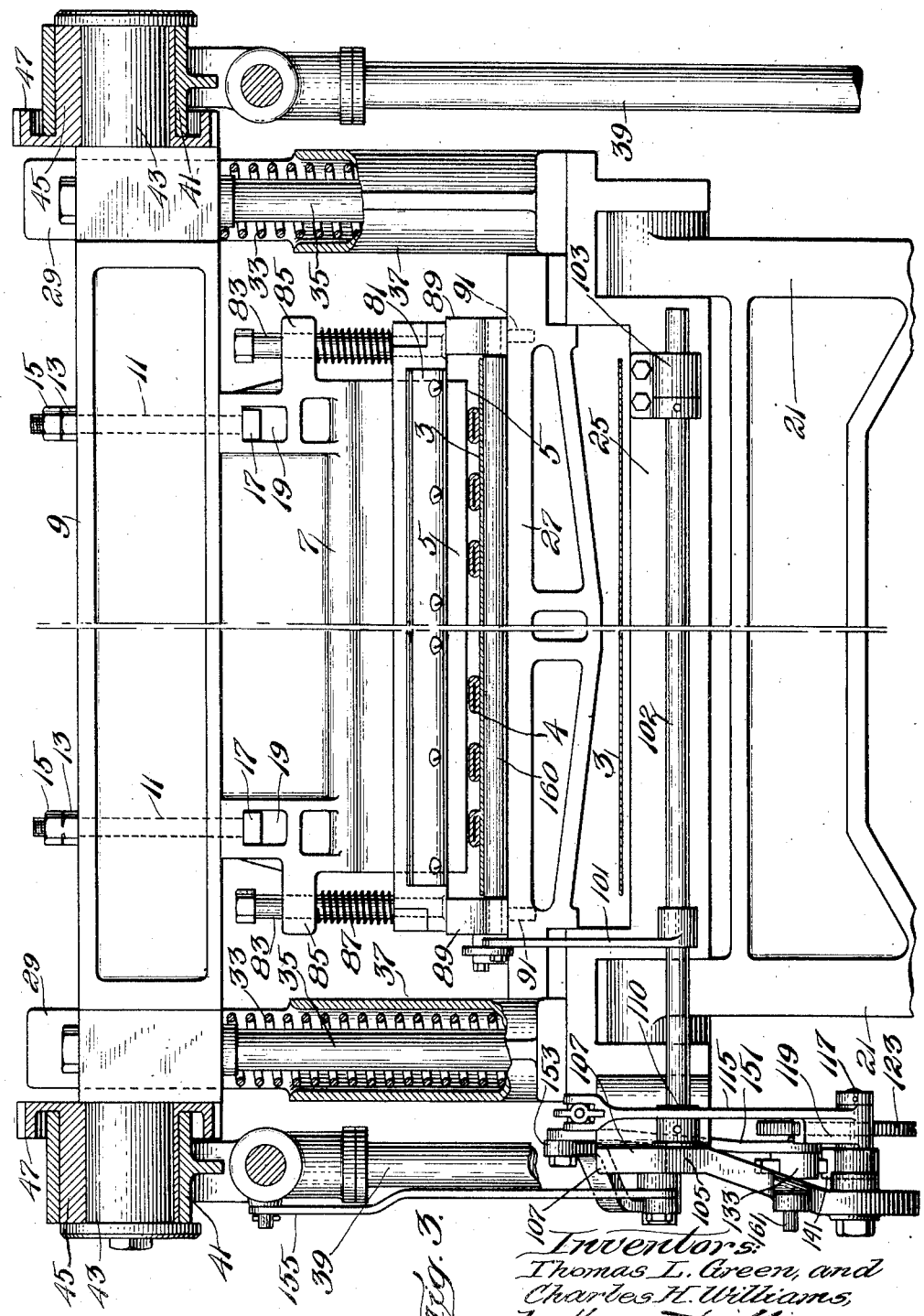

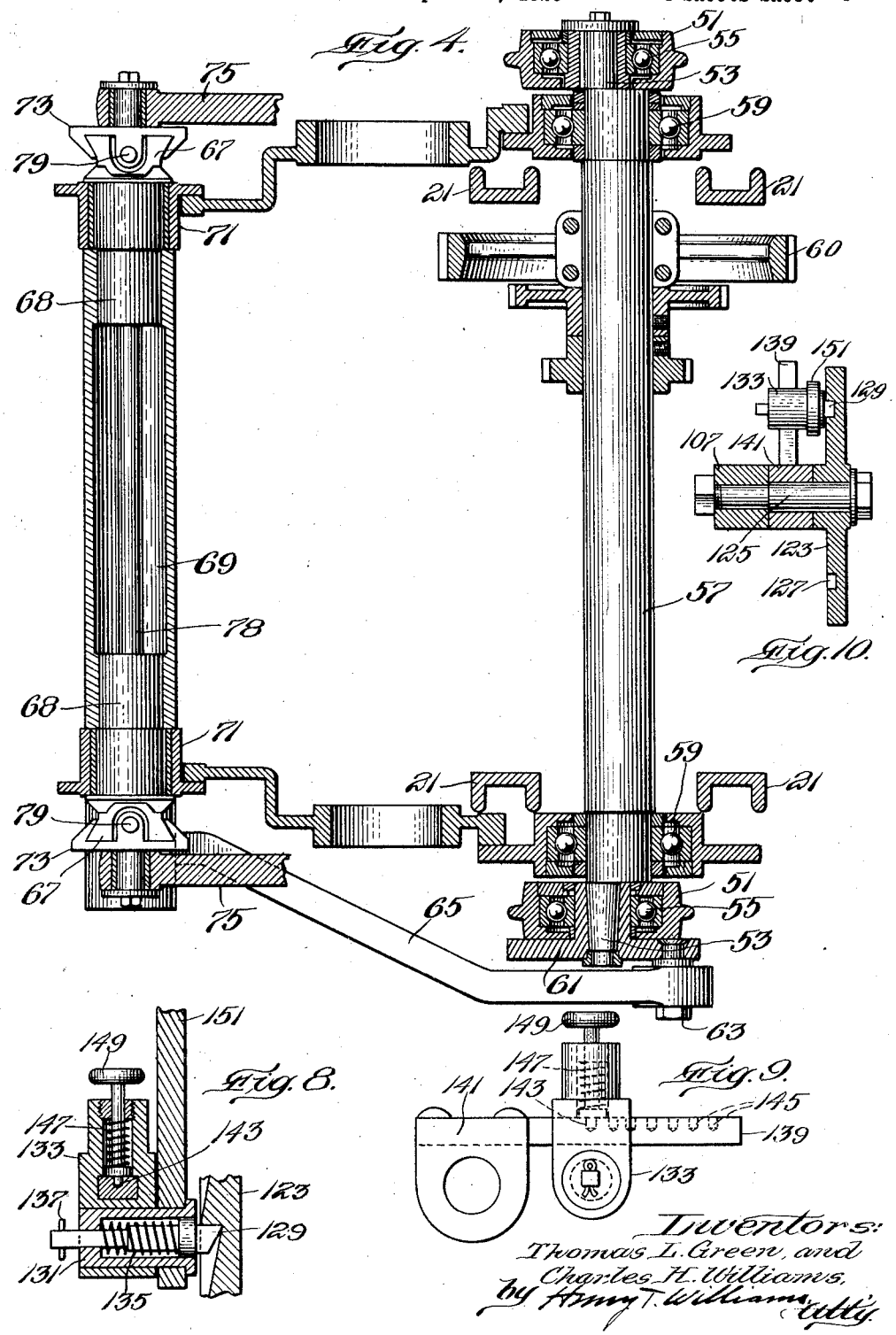

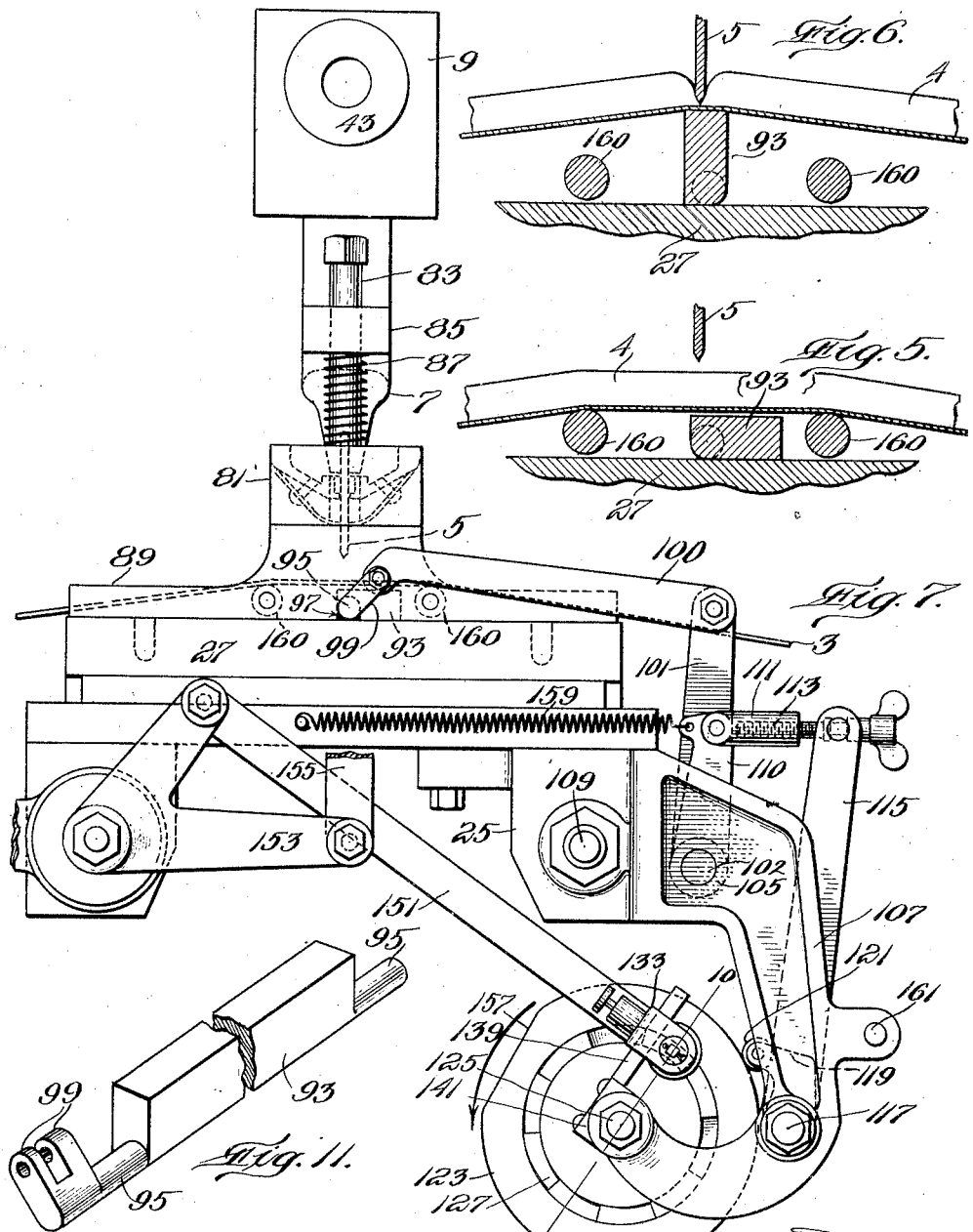

1,677,180

UNITED STATES PATENT OFFICE.

THOMAS L. GREEN AND CHARLES H. WILLIAMS, OF INDIANAPOLIS, INDIANA, ASSIGNORS TO SAID THOMAS L. GREEN, OF INDIANAPOLIS, INDIANA.

CUTTER MECHANISM FOR PLASTIC MATERIAL.

Application filed April 13, 1926. Serial No. 101,636.

The invention to be hereinafter described relates to biscuit cutting machines, and more particularly to a mechanism which may be applied to the usual type of biscuit cutting machine and operate automatically to cut a dough sheet or bars into predetermined lengths, such, for example, as are suitable to be deposited into pans. The mechanism may be employed not only to operate upon dough but also upon other plastic materials. The mechanism is more particularly intended for operating on dough bars containing a fig jam filling, said bars being formed by the well known method. Several of such bars may be fed by an apron in side-by-side parallel relation to and beneath a reciprocatory cutter.

The present mechanism provides a simple and efficient means which allows the cutter to make a predetermined number of idle reciprocations without coming down into engagement with the bars, and then the apron is raised somewhat so that the cutter will completely cut through the bars. Thus the cutter is rendered effective periodically to cut through the bars and produce lengths thereof suitable to be received by the pans in which the product is baked. After baking, the bar lengths may be divided into individual biscuits ready for packing.

Heretofore, the cutting of the bars into these lengths has been commonly done manually, with the result that uniformity of bar lengths was not obtained, but by the present automatic mechanism, uniform lengths are insured and without disfiguring and wasting any portions of the bar lengths so cut. Also, the mechanism is such that the bar lengths may be varied to suit pans of different sizes.

The character of the invention may be best understood by reference to the following description of one good form thereof shown in the accompanying drawings, wherein:

Fig. 1 is a front elevation of a portion of a biscuit cutting machine embodying the invention;

Fig. 2 is a plan showing bars severed to provide predetermined lengths suitable for pans;

Fig. 3 is a view partly in elevation and partly in section of a portion of the mechanism shown in Fig. 1;

Fig. 4 is a horizontal section taken on line 4—4 of Fig. 1;

Fig. 5 is a sectional detail view showing the relation of the apron and cutter when the latter is at the limit of its down stroke and the tumbler is in its inoperative position;

Fig. 6 is a view similar to Fig. 5 showing the tumbler in its operative position;

Fig. 7 on an enlarged scale is a side elevation of the mechanism for periodically moving the apron raising tumbler to its operative position;

Fig. 8 is a sectional detail showing the pawl and the block carrying the same;

Fig. 9 is a side view of the pawl block and the arm on which it is mounted;

Fig. 10 is a section taken on line 10—10 of Fig. 7; and

Fig. 11 is a perspective view of the tumbler.

Referring to the drawings, the portion of the biscuit cutting machine shown therein as illustrating one good form of the invention, comprises a suitable frame including a pair of side plates 1 (Fig. 1) which extend the length of the machine and carry the usual rollers and driving means for the endless apron 3, the upper run of which is adapted to convey a series of fig bars 4 beneath the cutter.

The cutter, in the present instance of the invention, is in the form of a blade 5 (Fig. 3) secured to a head 7 which is detachably connected to a cross-head 9 by bolts 11 extending vertically through the cross-head and having nuts 13 for engagement with the top of the cross-head, said nuts being secured by lock nuts 15. At the lower ends of the bolts 11 are heads 17 entered into T-shaped slots 19 in the cutter head. The construction is such that the cutter head may be laterally presented to the cross-head, and in the course of this movement the slots 19 will slide along the bolt heads 17 until limited by engagement of ends of the slots with the bolt heads. Then the nuts 13 may be set up, thereby securely to connect the cutter head to the cross-head.

The cross-head is carried by a frame which is reciprocable in a horizontal direction, in order that the cutter may move in unison with the travel of the apron when the cutter is operating on the fig bars. This frame, in the present instance comprises pairs of rocker arms 21 (Fig. 1) at opposite sides of the machine and adapted to oscillate with parallel motion about the axes of shafts 23 mounted on the side plates 1 referred to, adjacent the lower edges thereof. The upper ends of the rocker arms are connected to a saddle 25 carrying a bed plate 27 over which the upper run of the apron passes.

Mounted on the saddle at opposite ends thereof are stands 29 (Fig. 1) having guideways 31 adapted to receive the cross-head. Cushioning coil springs 33 are provided beneath the cross-head and encircle the rods 35 secured to and depending from the cross-head, said springs having portions occupying deep cups 37 mounted on the saddle.

Means for reciprocating the cross-head in the guideways of the stands comprises connecting rods 39 having their upper ends pivotally connected to sleeves 41 on trunnions 43 at the ends of the cross-head. Interposed between the sleeves 41 and the trunnions 43 are eccentric bushings 45 adapted to be given rotative adjustments in order that the cutter shall have the required relation to the bed plate and the work operated upon. These bushings are provided with gears 47 adapted to mesh with pinions under the control of a hand wheel 49. Since the connections between the hand wheel and pinions are understood in the art, it is unnecessary to disclose the same herein.

The lower ends of the connecting rods are secured to straps 51 (Fig. 4) receiving crank wrist pins 53, ball bearings 55 being interposed between the straps and wrist pins. The latter are at opposite ends of a shaft 57 journalled in ball bearings 59 mounted on the side plates of the machine, said shaft being provided with a gear 60 adapted to be driven from any suitable source of power.

To produce the horizontal reciprocation of the cutter carrying frame, a crank disk 61 (Figs. 1 and 4) is mounted on one end of the shaft 57 and has a wrist pin 63 connected by a pitman 65 with the lower end of one of a pair of rocker arms 67 having studs 68 in ends of a barrel 69 and journalled in bearings 71 mounted on the side plates. On the upper ends of the arms are blocks 73 connected by links 75 with the saddle 25 referred to. The extent of oscillation of the cutter carrying frame may be varied by adjusting the blocks 73 along the rocker arms 67. This adjustment may be accomplished by a hand wheel 77 on a shaft 78 extending through the barrel and adapted to rotate mitre gears (not shown) and screws 79 on the rocker arms and threaded to the blocks as is understood in the art. The construction is such that on rotation of the shaft 57 the crank disk 61 will operate through the pitman 65, the arms 67 and links 75 to cause the cutter carrying frame to reciprocate, and the timing of the mechanism is such that the cutter is caused to move in unison with the continuously moving apron in the direction of the travel of the latter while the cutter is acting on the material. Rotation of the shaft 57 will rotate the crank wrist pins 53, and the latter will operate through the straps and connecting rods 39 to reciprocate the cross-head, and the construction and adjustment are such that the cutter will move down toward but not to the apron without cutting into or through the bars.

To keep the cutter blade 5 in clear condition, a trough 81 (Figs. 3 and 7) is provided having a slot in the bottom thereof receiving the blade. This trough is carried by bolts 83 entered through ears 85 projecting outward from opposite ends of the cutter head 7. Coil springs 87 encircle the bolts and are confined between the trough and the ears 85. These springs urge the trough downward until limited by engagement of the bolt heads with the ears 85. Mounted on opposite ends of the saddle are stop lugs 89 having dowels 91 adapted for insertion in holes in the saddle. When the cross-head carrying the cutter and trough moves downward, the trough will be brought into engagement with the stop lugs 89, thereby arresting further downward movement of the trough, and as the cutter advances toward the apron, the coil springs 87 will be compressed. On the upward movement of the cross-head the cutter will pass upward in the trough slot so as to clear the cutter from any dough adhering thereto, and when the ears 85 reach the heads of the bolts 83, the trough and cutter will move on upward as a unit.

It is desirable that the cutter after a predetermined number of reciprocations shall cut entirely through the bars, for example, along lines $a$—$a$ (Fig. 2), in order that bar lengths may be produced suitable for the pans in which the product is baked. To accomplish this, the apron and the bars thereon are raised to a sufficient extent so that when the cutter moves down to the limit of its stroke, it will pass entirely through the bars.

The mechanism for this purpose, in the present instance comprises a rocker member or tumbler 93 (Figs. 7 and 11) mounted between the bed plate and apron and extending transversely of the apron. The tumbler has journals 95 at opposite ends thereof received by bearings 97 in the under sides of the stop lugs 89. At one end of the tumbler is an arm 99 angularly offset from the plane of the tumbler, and this arm is connected by a connecting rod 100 with the upper end of an arm 101 fast on a rock shaft 102 mounted in a bearing 103 (Fig. 3) on the saddle and mounted in a bearing 105 in a bracket 107 secured by a bolt 109 to the saddle (Fig. 7).

Fast on the rock shaft 102 is a short arm 110 connected by a clevis 111 having a screw 113 with the upper end of a rock arm 115 having a boss at the lower end thereof mounted on a stub shaft 117 on the bracket 107. Projecting from the boss is a short arm 119 carrying a roller 121 serving as a follower for engagement with the periphery of a cam 123 rotatively mounted on a stub shaft 125 carried by the lower end of the bracket 107. The face of the cam 123 is formed to provide a ratchet 127 and cooperating with said ratchet is a pawl 129 (Fig. 8) mounted in a socket 131 in a block 133, said pawl being urged toward the ratchet by a coil spring 135 encircling the stem of the pawl and confined between one end of the socket and the pawl. Movement of the pawl away from its socket is limited by engagement of a pin 137 on the pawl stem with an end of the socket.

The pawl carrying block 133 is mounted on an arm 139 (Fig. 9) secured to a hub 141 mounted on the stub shaft. In order that the pawl may be adapted to cooperate with ratchets having different numbers of teeth and different radii, the pawl block is slidably mounted on the arm 139 and is held in its positions of adjustment by a pin 143 adapted to enter any one of a series of holes 145 in the arm 139. This pin is urged toward the arm by a coil spring 147 in the block 133. The pin has a handle 149 which may be grasped to retract the pin and allow the block to slide along the arm to the position desired, and on release of the handle 149 the spring 147 will snap the pin 143 into one of the holes 145.

To oscillate the pawl carrying arm 139 on the stub shaft 125, the socket 131 of the pawl block 133 passes through an aperture in one end of the link 151 (Fig. 7), the opposite end of which is connected to one arm of a bell-crank 153 pivotally mounted on the saddle, the other arm of the bell-crank being connected by a link 155 with one of the connecting rods 39 referred to, for reciprocating the cross-head. The construction is such that when the cross-head moves the cutter down toward the apron, the pawl is retreated and wipes idly over the ratchet teeth, and when the cross-head moves the cutter upward, the pawl engages one of the ratchet teeth and advances the ratchet and cam a step. The cam has a periphery with a uniform radius throughout with the exception of a flattened portion 157 of shorter radius. The follower 121 is held against the periphery of the cam by a coil spring 159 (Figs. 1 and 7) having one end connected to the saddle and the opposite end connected to the arm 110 referred to. Apron supporting rollers 160 are mounted on the stop lugs at opposite sides of the tumbler. The tumbler has greater width than thickness and is adapted to be rocked to and from an operative position (Fig. 6) in which it lifts the apron toward the cutter. In use, the ratchet and cam will be rotated step-by-step on reciprocation of the cutter, and the tumbler will be held stationary in inoperative position (Fig. 5) until the flattened portion of the cam 123 reaches the follower. Thereupon, the coil spring 159 becomes effective to rock the tumbler and raise the apron so that on the next downward movement of the cutter it will pass entirely through the fig bars or other plastic material on the apron. Then on movement of the cutter up away from the apron, the cam will be turned a step to bring its portion of uniform radius in engagement with the follower. This will rock the tumbler back to its inoperative position. When the tumbler raises the apron, it lifts the latter from the rollers 160 and when the tumbler lowers the apron, it allows the latter to return to and receive support from said rollers.

When the machine is not used for fig bar work or other work requiring the periodic raising of the apron, the tumbler, rollers and stop lugs may be removed from the machine, and the link 155 may be disconnected from the connecting rod 39 to which it is attached and then be rocked down and be connected to a stop stud 161 carried by the bracket 107 where the link will be out of the way.

If it is desired to substitute a different cam for the cam 123 having a ratchet with a different number of teeth than the ratchet 127, the cam 123 and ratchet 127 may be removed from the stub shaft 125 and others may be introduced instead thereof. The pawl block may be adjusted along its arm 139 to a position properly to cooperate with the new ratchet. This provision for employing different ratchets is desirable in order that the fig bars may be cut to suit pans of different lengths.

The ratchet and the cam are rotated step-by-step on reciprocation of the cutter, and since the cam and ratchet are carried by the bracket which is mounted on the cutter carrying frame, the extent of the reciprocatory motion received by the pawl for the ratchet will be the same regardless of the extent or character of the horizontal reciprocatory motion of the cutter carrying frame.

The attachment for periodically raising the apron, that the cutter may periodically completely sever the bars or dough sheet on the apron, may be readily applied to the ordinary biscuit cutting machine. To accomplish this, the bracket 107 is secured to the saddle, the stop lugs 89 are mounted on the saddle with the tumbler 93 and rollers 160 between them, the tumbler connecting rod 100 is attached to the tumbler, the bell-crank 153 and the bearing 103 are secured to the saddle, and the link 155 is attached to one of the connecting rods 39.

Since the cutter reciprocating mechanism and the cutter frame reciprocating mechanism are so timed that the cutter frame will advance in unison with the apron when the cutter is in engagement with the work, and since the apron raising tumbler is brought to upright position beneath the cutter in timed relation to the reciprocation of the cutter, it follows that this operation of the tumbler is in timed relation to the reciprocation of the cutter carrier.

A cam and ratchet are selected to cause the plate to raise the apron so that the cutter will completely sever the bars into lengths which will utilize to the fullest extent the lengths of the pans in which the bars are to be baked. For example, in the present instance a cam and ratchet are employed which will allow the cutter to make nine idle strokes between two successive severing strokes.

While the mechanism has been described more particularly with reference to operation on fig bars, it will be understood that it may be used to operate upon other plastic materials.

It will be understood that the invention is not limited to the specific embodiment shown, and that various deviations may be made therefrom without departing from the spirit and scope of the appended claims.

What is claimed is:—

1. In a machine of the character described, the combination of an apron for receiving and feeding plastic material, a reciprocatory cutter, means for automatically reciprocating the cutter to cause the same to move toward, but not to the material at intervals, and means including a rocker member beneath the apron for automatically periodically raising the apron and the material thereon toward the cutter that the latter may cut through the material.

2. In a machine of the character described, the combination of an apron for receiving and feeding plastic material, a reciprocatory cutter, means for reciprocating the cutter to cause the same to move toward, but not to the material at intervals, a rocker tumbler beneath the apron, and means for automatically periodically causing the tumbler to raise the apron a distance at least equal to the thickness of the material so that the cutter will completely sever the material.

3. In a machine of the character described, the combination of an apron for receiving and feeding plastic material, a carrier having a cutter thereon, means for reciprocating the cutter toward and from the apron, means for imparting reciprocatory movement to the cutter carrier and having provision for causing the cutter to move in unison with the apron when the cutter engages the material, and means including a rocker tumbler for automatically periodically raising the apron so that downward movement of the cutter will completely sever the material.

4. In a machine of the character described, the combination of an apron for receiving and feeding plastic material, a reciprocatory cutter, means for reciprocating the cutter to cause the same to move toward, but not to the material, actuating means for causing the cutter to move in unison with the apron in the direction of the travel of the latter while the cutter engages the material, and means including a rocker tumbler operatively associated with the cutter reciprocating and actuating means for automatically raising the apron beneath the cutter after a predetermined number of reciprocations of the cutter, so that downward movement of the cutter will completely sever the material.

5. In a machine of the character described, the combination of an apron for receiving and feeding plastic material, a cutter, means for reciprocating the cutter to cause the same to move toward, but not to the material, a member beneath the apron having an apron lifting face, and means for automatically rocking the member periodically to bring said face in apron lifting position that the cutter may move to the apron.

6. In a machine of the character described, the combination of an apron for receiving and feeding plastic material, a reciprocatory cutter, means for reciprocating the cutter, a rocker member beneath the apron, and a mechanism for periodically causing the member to raise the apron toward the cutter that the latter may completely sever the material, said mechanism including a cam, and means for imparting step-by-step rotative movement to the cam on reciprocation of the cutter.

7. In a machine of the character described, the combination of an apron for receiving and feeding plastic material, a reciprocatory cutter, mean for reciprocating the cutter, and mechanism for automatically periodically raising the apron that the cutter may move through the material to the apron, said mechanism including a rocker tumbler beneath the apron, a cam, a follower for the cam, a rocker arm, a spring operating through the rocker arm to hold the follower against the cam, means connecting the rocker arm with the tumbler, and means for imparting step-by-step rotative movement to the cam on reciprocation of the cutter, said cam having a portion of uniform radius, and a portion of less radius for allowing the spring to actuate the rocker arm and cause the tumbler to raise the apron.

8. In a machine of the character described, the combination of a bed plate, a cutter, an apron for feeding plastic material over the bed plate beneath the cutter, means for reciprocating the cutter, and mechanism for periodically raising the apron toward the cutter comprising a pair of members on the bed plate, a rocker tumbler extending between and pivotally connected to said members, and means for automatically rocking said tumbler to raise and lower the apron.

9. In a machine of the character described, the combination of an apron for receiving and feeding plastic material, a reciprocatory cutter, means for reciprocating the cutter, and a mechanism for automatically periodically raising the apron that the cutter may move to the apron and sever the material, said mechanism including a pawl, a ratchet, connections between the pawl and the cutter reciprocating means for causing the pawl to impart step-by-step rotative movement to the ratchet, a cam rotated by the ratchet, a follower for the cam, a rocker tumbler beneath the apron, and means actuated by the cam and follower for rocking the tumbler to raise and lower the apron.

10. In a machine of the character described, the combination of an apron for receiving and feeding plastic material, a frame having a cutter, means for reciprocating the cutter, means for reciprocating the cutter frame to cause the cutter to move in unison with the travel of the apron and material when acting on the material, and mechanism including a rocker tumbler for automatically periodically raising the apron and material sufficiently to cause the cutter to sever the material, said mechanism being operable in timed relation with respect to the cutter reciprocating means and the cutter frame reciprocating means.

11. In a machine of the character described, the combination of a support, an apron on the support for receiving and feeding plastic material, a carrier, a cross-head on the carrier, a cutter on the cross-head, a shaft on the support, cranks on the shaft, connecting rods extending from the cranks to the cross-head for reciprocating the latter, a cam, pawl and ratchet means, means operated on reciprocation of the cross-head for causing the pawl and ratchet means to impart step-by-step rotative movement to the cam, a follower for the cam, a rocker tumbler beneath the apron, and means for transmitting movement from the cam follower to the tumbler, said cam being formed to cause the tumbler periodically to move to a position to raise the apron sufficiently to cause the cutter to sever the material.

12. In a machine of the character described, the combination of an apron for receiving and feeding plastic material, a frame, a reciprocatory cutter on the frame, means for reciprocating the cutter to cause the same to move toward, but not to the material at intervals, a bed plate mounted on the cutter frame, a rocker tumbler mounted on the bed plate beneath the apron, and means for automatically moving the tumbler to raise the apron beneath the cutter to cause the cutter to sever the material after the cutter has made a predetermined number of reciprocations.

13. In a machine of the character described, the combination of an apron for receiving and feeding plastic material, a frame having guideways therein, a cross-head reciprocable in said guideways, a cutter carried by the cross-head, means for reciprocating the cross-head and cutter with a predetermined amplitude of movement to cause the cutter to move toward, but not to the material at intervals, and means including a rocker tumbler for automatically periodically raising the apron toward the cutter that the latter may sever the material.

14. In a machine of the character described, the combination of an apron for receiving and feeding plastic material, a cutter, means for reciprocating the cutter, and means for periodically raising the apron and the material toward the cutter, comprising a rocker tumbler beneath the apron, a pawl and a ratchet, a cam rotated step-by-step by the ratchet, a support for the ratchet having provision for receiving any one of several ratchets having different numbers of teeth, and means for adjusting the pawl to suit the different ratchets.

15. An attachment for biscuit cutting machines of the type in which dough is fed by an apron over a bed plate beneath a reciprocating cutter, comprising a rocker tumbler adapted for insertion between the bed plate and apron, a bracket adapted to be secured to the bed plate support, a mechanism carried by the bracket including a cam, a pawl and ratchet; means for causing the pawl to advance the ratchet step-by-step on reciprocation of the cutter, and means between the cam and the tumbler for causing the tumbler to raise the apron periodically toward the cutter.

16. In a machine of the character described, the combination of a reciprocatory carrier having a bed plate, a cutter on the carrier, means for reciprocating the cutter toward and from the bed plate, an apron for feeding plastic material over the bed plate beneath the cutter, a pair of members mounted on the bed plate, a pair of rollers mounted on said members furnishing support to the apron, a rocking tumbler mounted on said members between said rollers, and means for automatically periodically rocking said tumbler to a position for lifting the apron from said rollers.

17. In a machine of the character described, the combination of a reciprocatory carrier, a cutter on the carrier, an apron for feeding plastic material beneath the cutter, means for reciprocating the cutter toward and from the apron, a rocking member mounted on the carrier beneath the apron, mechanism on the carrier including a cam, its follower, a ratchet, its pawl, a bell-crank, a link connecting one arm of the bell-crank with the pawl, and a link connecting the other arm of the bell-crank with the means for reciprocating the cutter; and connections between the cam follower and rocking member, said cam being formed periodically to rock said member to a position for raising the apron toward the cutter.

18. In a machine of the character described, the combination of a cutter, an apron for feeding plastic material beneath the cutter, means for reciprocating the cutter toward and from the apron, a rocker tumbler beneath the apron movable to positions for raising and lowering the apron beneath the cutter, and means for automatically periodically moving said tumbler including a cam, a follower engaging the cam, means including a spring for urging the follower toward the cam, means for advancing the cam step-by-step, and means for transmitting movement from the cam follower to the tumbler.

19. In a machine of the character described, the combination of a carrier having a bed plate, a cross-head on the carrier, a cutter connected to the cross-head, means for reciprocating the cross-head and cutter, an apron for feeding plastic material over the bed plate beneath the cutter, a rocker tumbler mounted on the bed plate movable to and from an operative position for lifting the apron toward the cutter, and means for automatically holding the tumbler in inoperative position during a predetermined number of reciprocations of the cutter and having provision for moving said tumbler to its operative apron lifting position after said predetermined number of reciprocations of the cutter.

THOMAS L. GREEN.
CHARLES H. WILLIAMS.